United States Patent
Chen et al.

(10) Patent No.: US 8,056,811 B2
(45) Date of Patent: Nov. 15, 2011

(54) ANTI-MISINSERTION MECHANISM OF CARD CONNECTOR

(75) Inventors: Arthur Chen, Taipei (TW); Kenny Tai, Taoyuan Hsien (TW); Aruong Juang, Taoyuan Hsien (TW); Benny Chen, Taoyuan Hsien (TW)

(73) Assignee: FCI, Versailles (FR)

( * ) Notice: Subject to any disclaimer, the term of this patent is extended or adjusted under 35 U.S.C. 154(b) by 1697 days.

(21) Appl. No.: 10/528,458

(22) PCT Filed: Sep. 20, 2003

(86) PCT No.: PCT/SG03/00227
§ 371 (c)(1),
(2), (4) Date: Oct. 6, 2005

(87) PCT Pub. No.: WO2004/027699
PCT Pub. Date: Apr. 1, 2004

(65) Prior Publication Data
US 2006/0091211 A1    May 4, 2006

(30) Foreign Application Priority Data
Sep. 20, 2002 (TW) .............................. 91121605 A

(51) Int. Cl.
*G06K 13/00* (2006.01)

(52) U.S. Cl. ........................................ 235/475; 235/482

(58) Field of Classification Search .................. 235/475, 235/482, 485, 441, 453, 483
See application file for complete search history.

(56) References Cited

U.S. PATENT DOCUMENTS

| | | | | |
|---|---|---|---|---|
| 5,569,898 A | | 10/1996 | Fisher et al. | 235/448 |
| 6,527,187 B1 | * | 3/2003 | Nagata et al. | 235/475 |
| 6,616,050 B1 | * | 9/2003 | Oki et al. | 235/479 |
| 7,370,804 B2 | * | 5/2008 | Ishii | 235/475 |

FOREIGN PATENT DOCUMENTS

| | | |
|---|---|---|
| EP | 0 939 582 A2 | 9/1999 |
| EP | 1 324 256 A1 | 7/2003 |
| JP | 200376944 | 3/2003 |

* cited by examiner

*Primary Examiner* — Daniel St. Cyr
(74) *Attorney, Agent, or Firm* — Harrington & Smith

(57) ABSTRACT

An anti-misinsertion mechanism for a card connector defining a correct card connector thickness, the mechanism including: a body; a first link generally extending along the body, the first link including an actuator for actuating the first link to be rotated from a normal position toward an operating position upon detecting existence of the correct thickness of a partially-inserted card; and a second link provided with a stopper for selectively preventing full insertion of the card, the second link being pivoted to the body and operatively connected to the first link, thereby being rotatable between a normal position and an operating position relative to the normal and operating positions of the first link.

20 Claims, 6 Drawing Sheets

ANTI-MISINSERTION MECHANISM OF CARD CONNECTOR

FIELD OF INVENTION

This invention relates to the technology of recognizing card thickness in a mechanical manner to prevent reading of improper cards by a terminal.

BACKGROUND OF INVENTION

Since the invention of the first IC card by Piland Moreno in 1970, IC card technology has been widely implemented in various fields. The main applications of IC cards are in the fields of IC smart cards and IC memory cards. However, other types of cards are also applicable. Smart cards are of a thinner profile, having a configuration similar to a credit card and a thickness of approximately 0.76 mm. Known applications of smart cards include banking, health care, telecommunication and MRT systems. Memory cards also known as PCMCIA cards or PC cards, which are of a thicker profile, have a dimension similar to a business card and follow the protocols established by the Personal Computer Memory Card International Association. There are three types of PCMCIA cards, which are Type I (3.3 mm), Type II (5.5 mm) and Type III (10.5 mm). Known applications of PCMCIA cards include electronic or video games, electronic dictionaries, modems, audio and Ethernet cards.

With the flourishing developments of technology nowadays, there are various means for recording data. The trend of allowing a single terminal to access a smart card and a PC card simultaneously is inevitable. However, due to the similar dimensions of a smart card and a PC card, an IC card having a thinner profile may be inadvertently inserted into a cardbus adapted to a memory card, which may cause system errors. Hence, it is necessary to provide an anti-misinsertion mechanism for preventing misinsertion of a thinner smart card into a cardbus adapted to a memory card, which may cause system errors.

SUMMARY OF INVENTION

It is, thus, a primary objective of this invention to provide an anti-misinsertion mechanism for selectively preventing full insertion of a card after determining whether the partially-inserted card is of a proper thickness.

To achieve this objective, this invention discloses an anti-misinsertion mechanism comprising: a body, a first link, a second link, and a recovering means. The first and second links are pivotally provided to the body and operatively connected to each other. The first link includes an actuator for detecting the thickness of a partially-inserted card. The second link includes a stopper for selectively preventing full insertion of the card. When the first link detects existence of the correct thickness of a partially-inserted card, the first link is rotated to drive the second link to disable the stopper and allow full insertion of the card. When the first link fails to detect existence of the correct thickness of a partially-inserted card, the stopper of the second link prevents the card from being fully inserted.

This invention also provides a recovering mechanism for returning the anti-misinsertion mechanism to its original position after each use.

The structures and characteristics of this invention can be realized by referring to the appended drawings and explanations of the preferred embodiments.

DETAILED DESCRIPTIONS OF EMBODIMENTS

Figure 1:
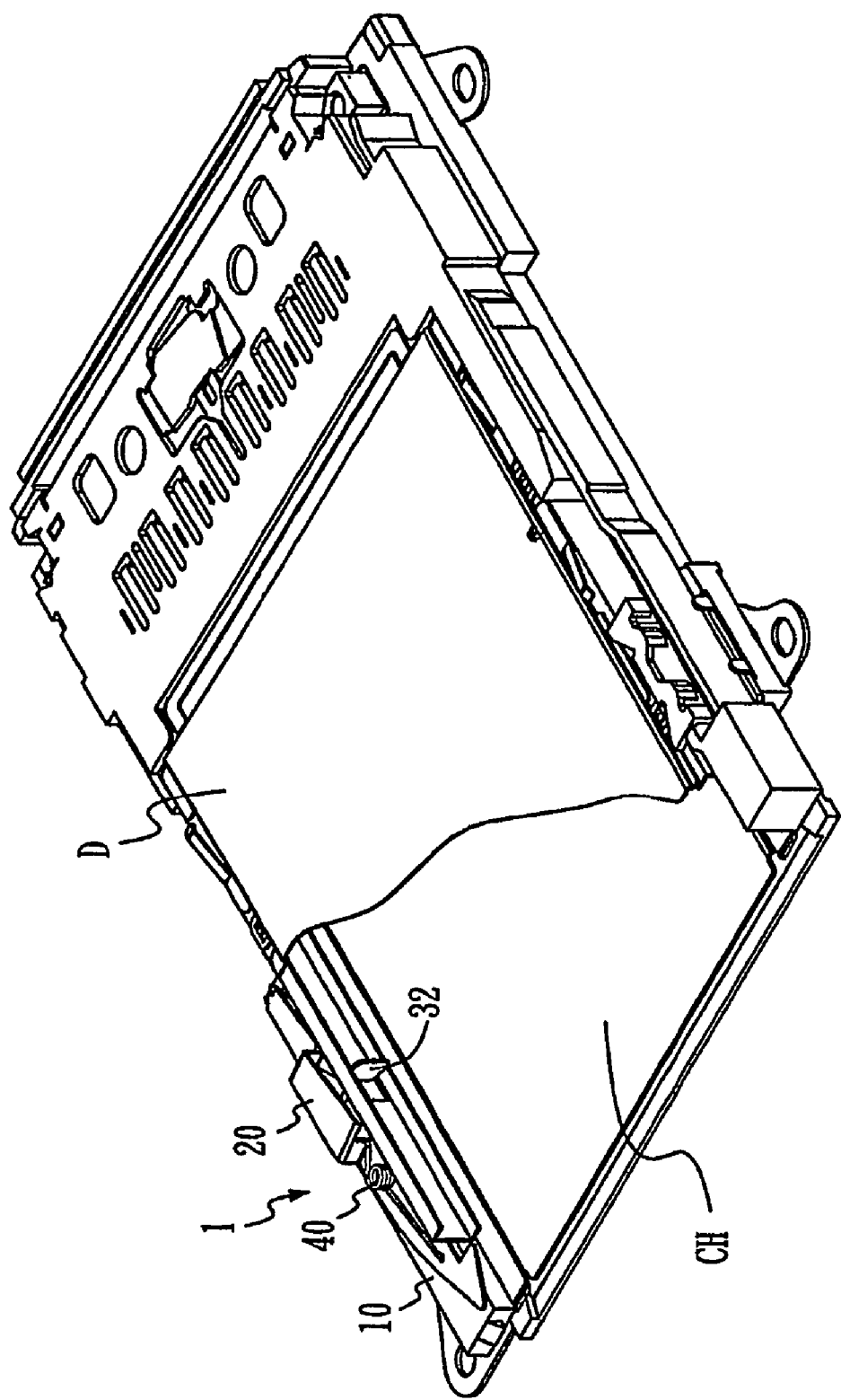
FIG. 1 is a schematic view of an anti-misinsertion mechanism mounted to a cardbus.

FIG. 1 is a schematic view of an anti-misinsertion mechanism 1 mounted to a card connector assembly (hereinafter referred to as cardbus D for example). The anti-misinsertion mechanism 1 comprises: a body 10, a first link 20, a second link 30 and a recovering means.

Figure 3:
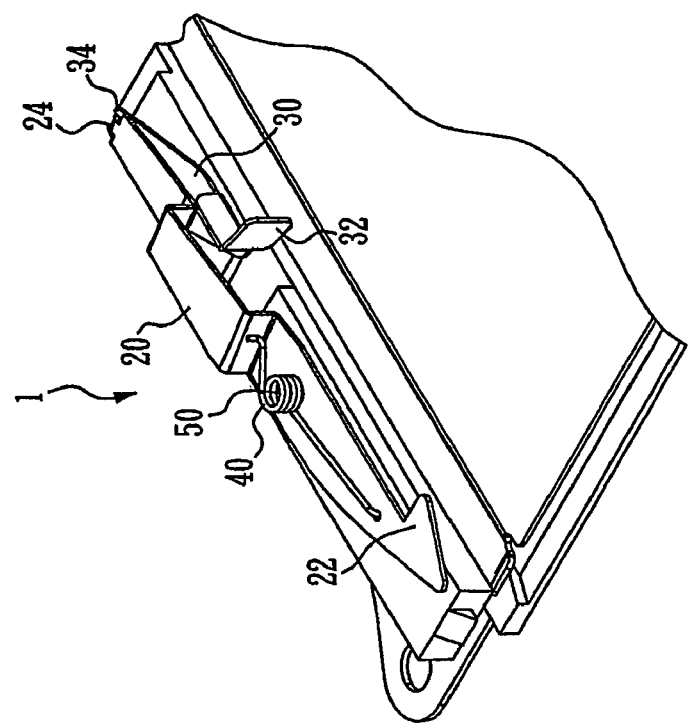
FIG. 3 is an assembled view of an anti-misinsertion mechanism according to the present invention.
Figure 2:
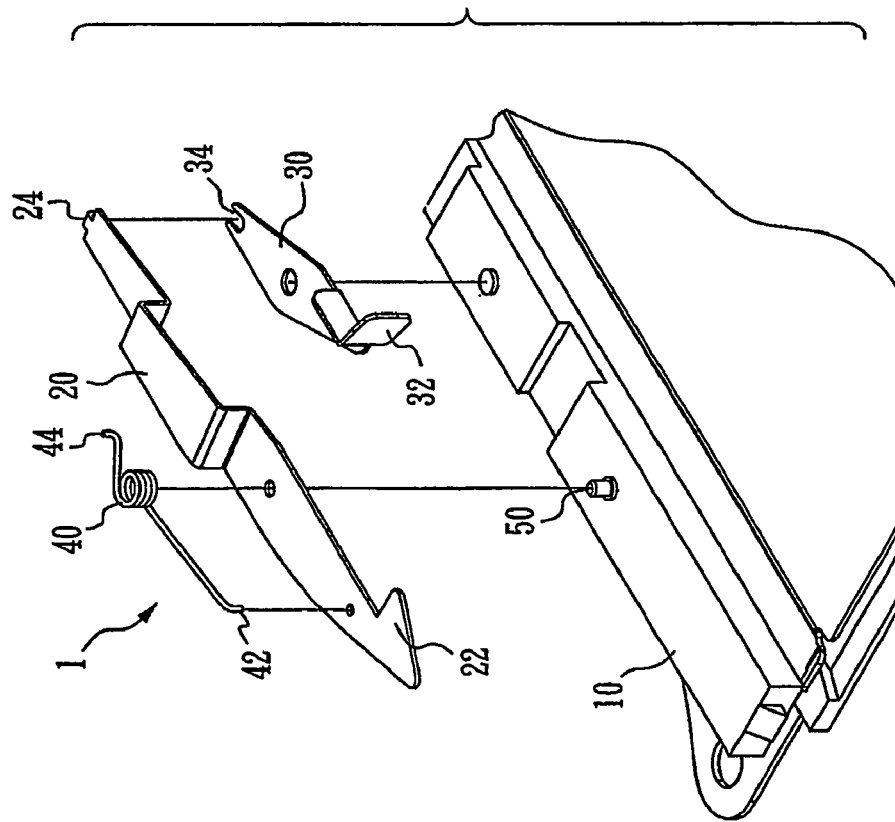
FIG. 2 is an exploded, perspective view of an anti-misinsertion mechanism according to the present invention.

As illustrated in FIGS. 2 and 3, the body 10 may be assembled to the cardbus D for mounting the anti-misinsertion mechanism 1. The body 10 is preferably assembled to a location neighboring an opening of the cardbus D.

The first link 20 generally extends along a longitudinal direction of the body 10 and is pivotally coupled to the body 10 to rotate between a normal position and an operating position. The first link 20 includes an actuator 22 and a tail 24. The actuator 22 is preferably a tab projecting into a slot CH (FIG. 1) of the cardbus D for detecting whether a card C partially inserted into the slot CH has a proper thickness.

The second link 30 generally extends along a longitudinal direction of the body 10 and is pivotally coupled to the body 10 to rotate between a normal position and an operating position. The second link 30 includes a stopper 32 and a tail 34. When the second link 30 is under normal position, the stopper 32 extends into the slot CH to prevent full insertion of the card C into the cardbus D. When the second link 30 is rotated to operating position, the stopper 32 is receded from the slot CH and thus becomes disabled, to allow full insertion of the card C into the cardbus D. The tail 34 connects to and the tail 24 of the first link 20, in an end-to-end fashion, to form an operative connection between the first link 20 and the third link 30. In other words, rotation of one of the first and second links will drive rotation of the other of the first and second links.

The recovering means subjects the first link 20 to return to normal position from operating position. The recovering means is preferably a spring 40 providing biasing resilience between the first link 20 and a fixed object (such as the cardbus D). The spring 40 preferably includes a first end 42 and a second end 44, which are each biased against the first link 20 and the fixed object to provide a torque for rotating the first link 20. A pivot 50 is fixed to the first link 20 for mounting the spring 40.

Figure 4:
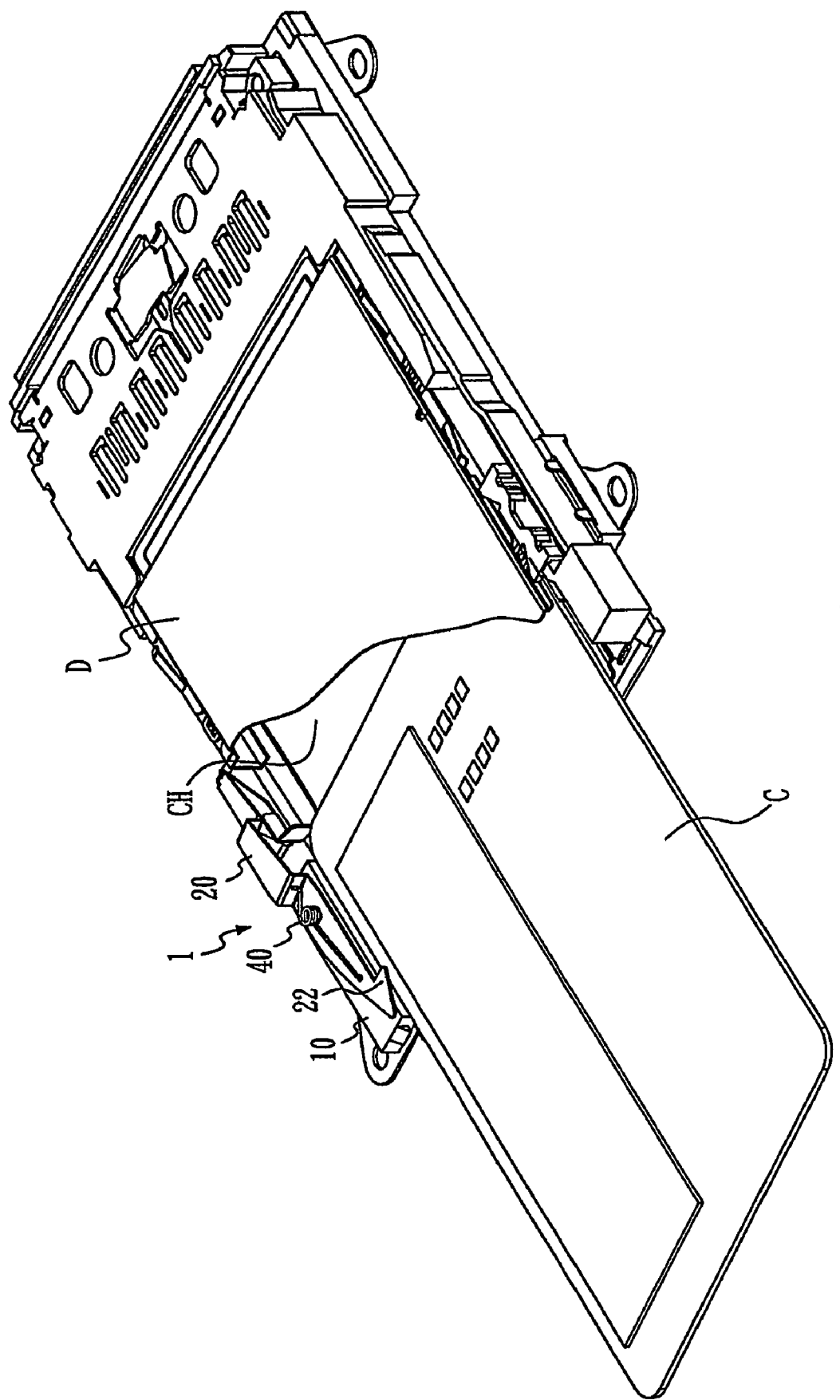
FIG. 4 is a schematic view illustrating the insertion of a card not of a proper thickness into a cardbus.
Figure 5:
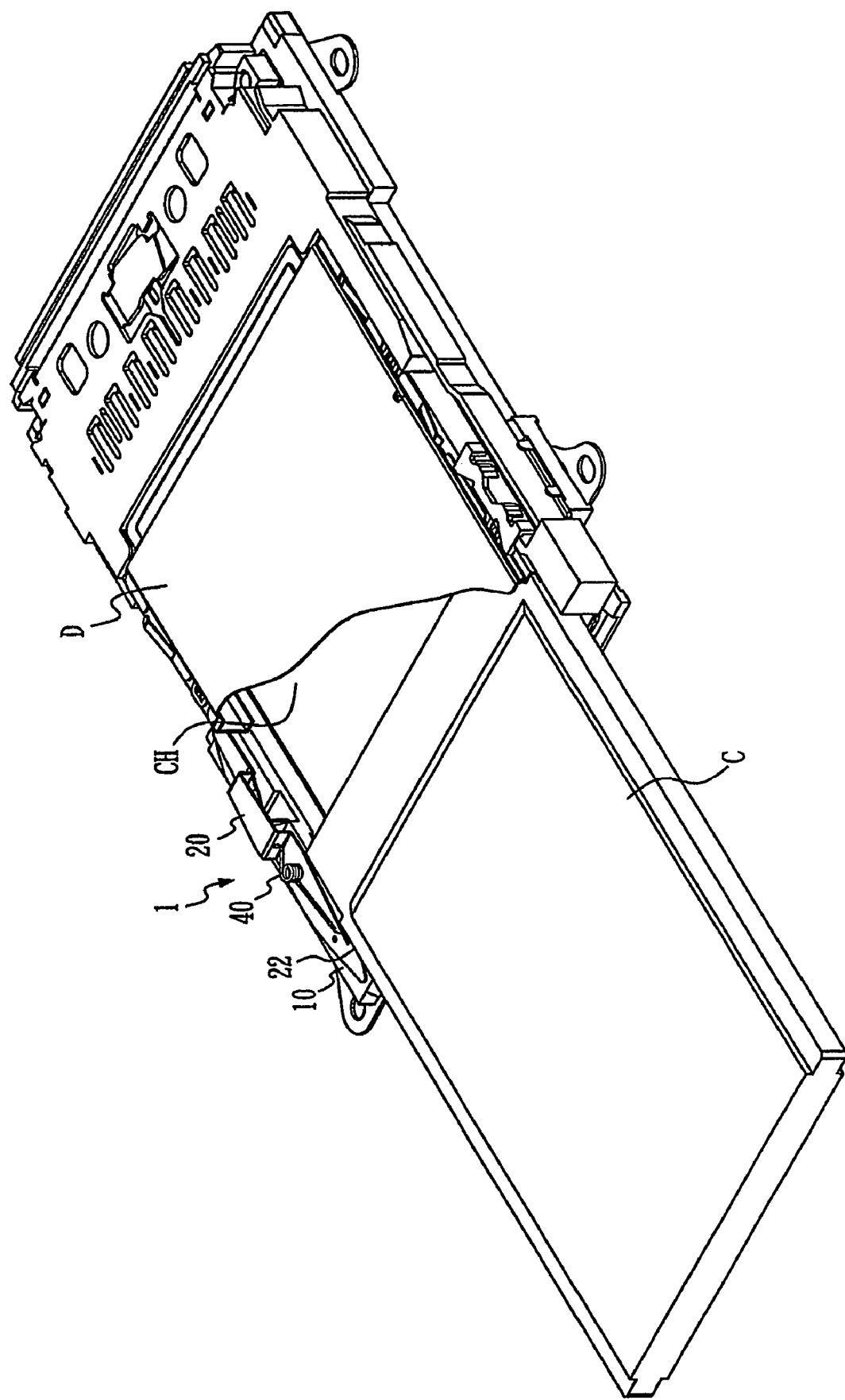
FIG. 5 is a schematic view illustrating the insertion of a card having a proper thickness into a cardbus.
Figure 6C:
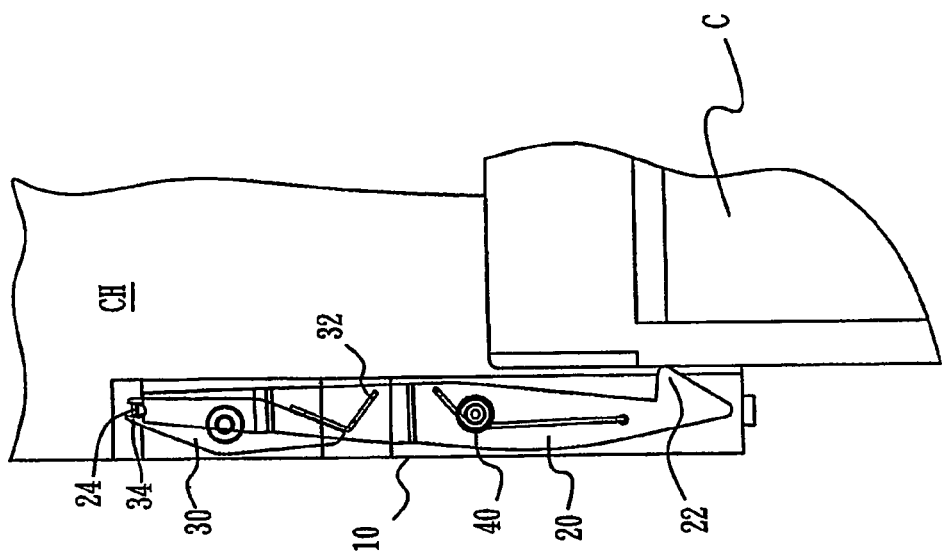
FIGS. 6a to 6c illustrate the detailed operations of the anti-misinsertion mechanism during the insertion of a card having a proper thickness into a cardbus.
Figure 6B:
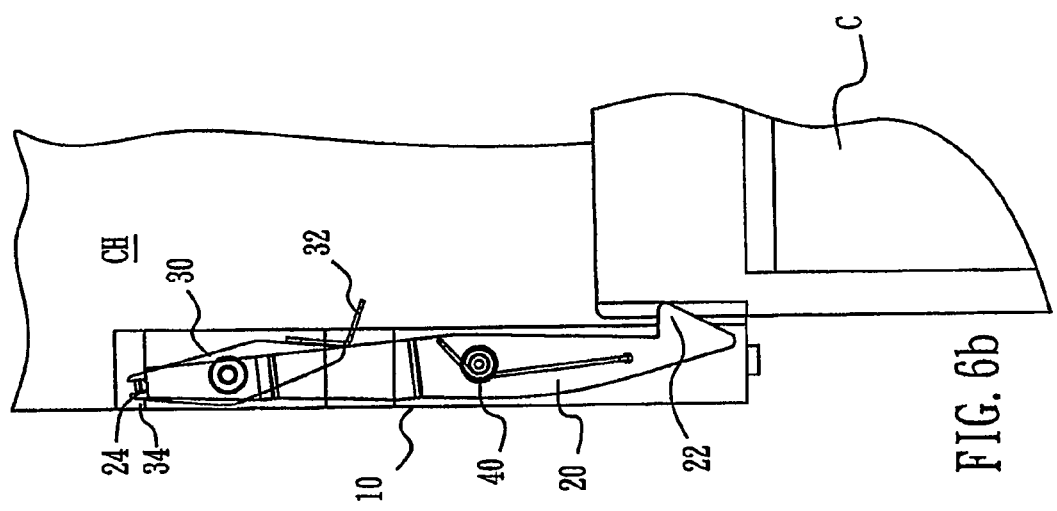
Figure 6A:
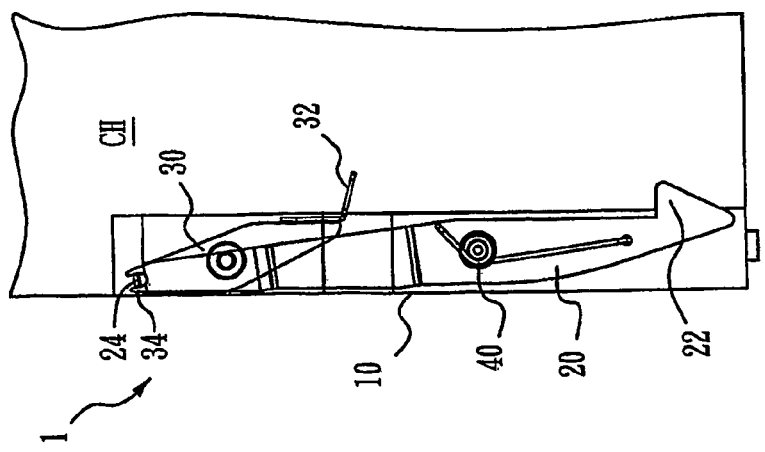

FIG. 4 is a schematic view illustrating the insertion of a card C not of a proper thickness into the cardbus D. When inserting a card C not of a proper thickness into the cardbus D, the actuator 22 cannot be actuated because the card C passes underneath the actuator 22, such that the stopper 32 still remains in the slot CH for preventing full insertion of the card C.

FIGS. 5 and 6a to 6c illustrate the detailed operations of the anti-misinsertion mechanism 1 during insertion of a card C having a proper thickness into the cardbus D. When inserting a card C having a proper thickness into the slot CH, the card C will press against the actuator 22 subjecting the stopper 32 to recede from the slot 32 to disable the stopper 32. When removing the card C from the cardbus D, the torque of the spring 40 will returns the first link 20 to its normal position, where the actuator 22 re-enters the slot CH.

Figure 7B:
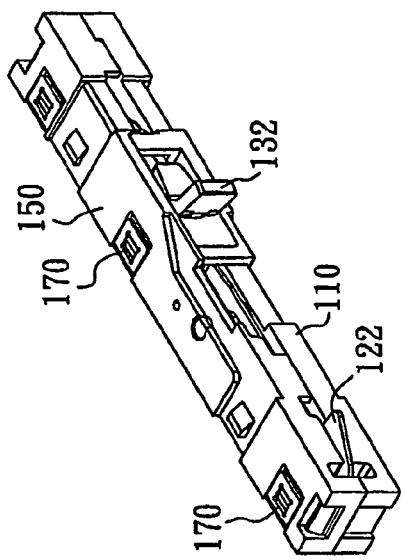
FIGS. 7a and 7b are exploded and assembled, exploded views of an alternative embodiment according to the present invention.
Figure 7A:
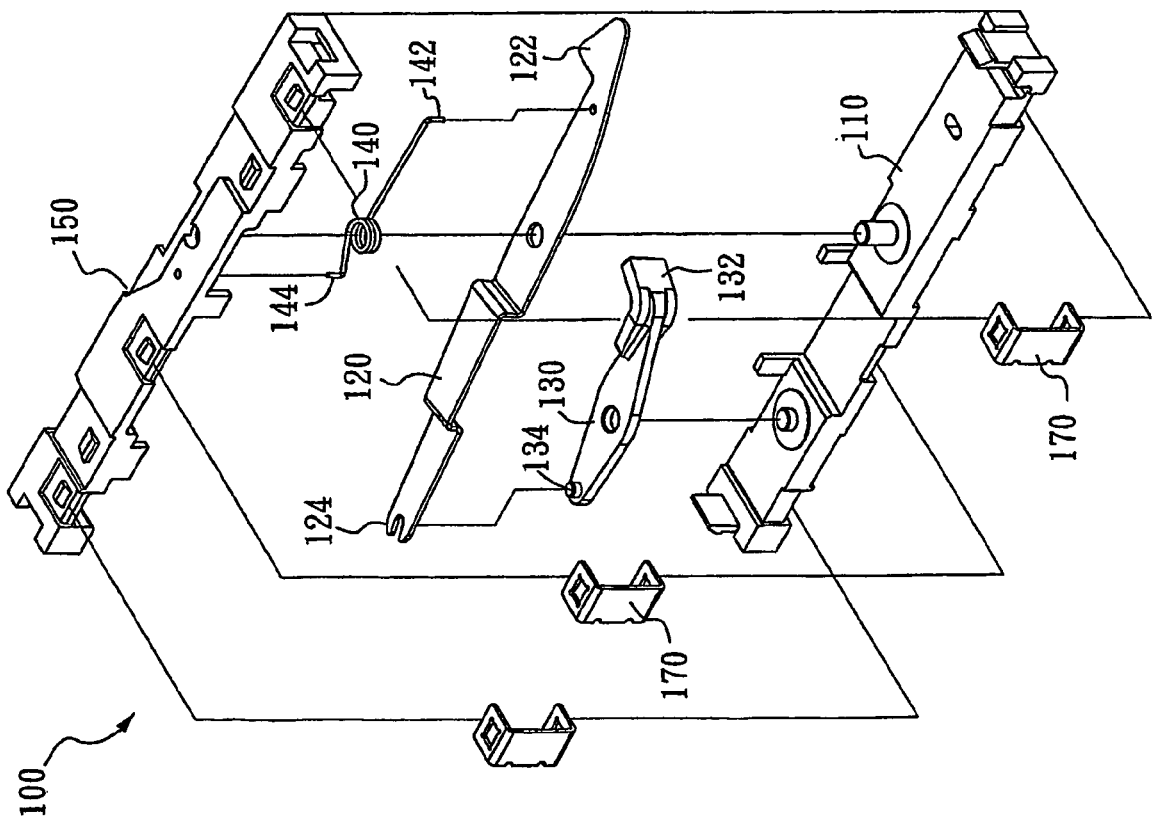

FIGS. 7a and 7b are exploded and assembled, exploded views of an alternative embodiment of the anti-misinsertion mechanism 100 according to the present invention, derived from the operation principles disclosed in FIGS. 1 to 6c. The anti-misinsertion mechanism 100 comprises: a body 110, a first link 120, a second link 130, a recovering means and a lid 150.

The operations of this embodiment are substantially identical to those of the first embodiment. The first link 110 generally extends along a longitudinal direction of the body 110 and pivotally coupled to the body 110 to rotate between a normal position and an operating position. The first link 110 includes an actuator 122 and a tail 24. The second link 130 generally extends along a longitudinal direction of the body 110 and pivotally coupled to the body 110 to rotate between a normal position and an operating position. The second link 130 includes a stopper 132 and a tail 134. The recovering means subjects the first link 120 to return to the normal position from the operating position. Biasing resilience is provided between the first link 120 and the lid 150. The recovering means is preferably a spring 140 having a first end 142 and a second end 144 that are each biased against the first link 120 and the lid 150 to provide a torque for rotating the first link 120. The lid 150 and the body 110 are coupled to each other by at least one fastener 170. This invention can be applied whenever two types of cards having different thickness are used. For example, this invention is useful when the connector assembly is a stacked type connector. (Two different types of cards having different thickness are inserted to different slots respectively.)

This invention is related to a novel creation that makes a breakthrough in the art. Aforementioned explanations, however, are directed to the description of preferred embodiments according to this invention. Various changes and implementations can be made by persons skilled in the art without departing from the technical concept of this invention. Since this invention is not limited to the specific details described in connection with the preferred embodiments, changes to certain features of the preferred embodiments without altering the overall basic function of the invention are contemplated within the scope of the appended claims.

LISTING OF NOMENCLATURES

| | |
|---|---|
| 1 | anti-misinsertion mechanism |
| 10 | body |
| 20 | first link |
| 22 | actuator |
| 24 | tail |
| 32 | stopper |
| 30 | second link |
| 34 | tail |
| 40 | recovering means/spring |
| 42, 42 | first end and second end |
| 50 | pivot |
| 100 | anti-misinsertion mechanism |
| 110 | body |
| 120 | first link |
| 122 | actuator |
| 124 | tail |
| 130 | second link |
| 132 | stopper |
| 134 | tail |
| 140 | recovering means/spring |
| 142 | first end |
| 144 | second end |
| 150 | lid |
| 170 | fastener |
| C | card |
| CH | slot |
| D | cardbus |

What is claimed is:

1. An anti-misinsertion mechanism for a card connector defining a correct card thickness, the mechanism comprising:
   a body;
   a first link generally extending along the body, the first link including an actuator adapted to actuate the first link by rotation from a normal position toward an operating position upon detecting existence of the correct thickness of a partially-inserted card; and
   a second link provided with a stopper adapted to selectively prevent full insertion of the card, the second link being pivoted to the body and operatively mechanically connected to the first link, thereby being rotatable between a normal position and an operating position relative to the normal and operating positions of the first link.

2. The anti-misinsertion mechanism of claim 1, wherein the second link is adapted to be rotated from the normal position to the operating position with the stopper being disabled in response to actuation of the actuator to allow full insertion of the card.

3. The anti-misinsertion mechanism of claim 1, further comprising recovering means for actuating the first link to be rotated toward the normal position.

4. The anti-misinsertion mechanism of claim 3, wherein the second link is adapted to be rotated toward the normal position with the stopper being enabled in response to the recovering means.

5. The anti-misinsertion mechanism of claim 3, wherein the recovering means is a spring having a first end and a second end, the first and second ends being each biased against the first link and a fixed object to provide a torque for rotating the first link.

6. The anti-misinsertion mechanism of claim 5, wherein the spring is positioned at a pivot located at the middle of the first link and the actuator is provided at a free end of the first link for detecting the existence or non-existence of the partially-inserted card.

7. The anti-misinsertion mechanism of claim 5, wherein the fixed object is a lid coupled to the body.

8. The anti-misinsertion mechanism of claim 7, wherein the lid and the body are coupled to each other by at least one fastener.

9. The anti-misinsertion mechanism of claim 1, wherein the first link and the second link are connected end-to-end together.

10. A card connector comprising the anti-misinsertion mechanism of claim 1.

11. An anti-misinsertion mechanism for a card connector, the mechanism comprising;
 a body;
 a first link generally extending along the body and pivotably connected to the body, wherein the first link comprises an actuator adapted to be contacted by a first card having a first thickness inserted into the card connector and thereby detect existence of a correct thickness of the first card, wherein the first link is adapted to be rotated by the first card from a normal position toward an operating position upon being contacted by the first card; and
 a second link movably connected to the first link, wherein the second link comprises a stopper adapted to selectively prevent full insertion of a second card having a second different thickness into the card connector, wherein the second link is pivotably connected to the body and operatively mechanically connected to the first link, wherein the second link is rotatable between a normal position and an operating position relative to the first link.

12. The anti-misinsertion mechanism of claim 11, wherein the second link is directly connected to the first link.

13. The anti-misinsertion mechanism of claim 11, wherein an end of the first link is connected to an end of the second link.

14. The anti-misinsertion mechanism of claim 13, wherein the end of the first link is located in a slot in the end of the second link.

15. The anti-misinsertion mechanism of claim 11, wherein the first link is located, at least partially, directly over the second link.

16. The anti-misinsertion mechanism of claim 11, wherein an actuator of the first link is adapted to be directly contacted by a lateral side edge of the first card to move the first link to the operating position.

17. The anti-misinsertion mechanism of claim 16, wherein the actuator of the first link is adapted to allow a second card having a smaller thickness than the first card to pass underneath the actuator without moving the actuator to the operating position.

18. A card connector comprising:
 a frame forming a card receiving slot; and
 the anti-misinsertion mechanism of claim 11 connected to the frame, wherein the actuator is located to be contacted and moved by a lateral side edge of the first card to its operating position when the first card is inserted into the card receiving slot, and wherein the actuator is located not to be moved to the operating position by the lateral side edge of the second card when the second card is inserted into the card receiving slot.

19. A card connector comprising the anti-misinsertion mechanism of claim 11, wherein pivot connections of the first and second links to the body are parallel to each other and generally transverse to a direction of insertion of the card into the card connector.

20. A card connector comprising:
 a frame forming a card receiving slot;
 an anti-misinsertion mechanism connected to the frame, the mechanism comprising:
  a body;
  a first link generally extending along the body and pivotably connected to the body; and
  a second link pivotally connected to the body and directly movably connected to the first link, wherein the second link comprises a stopper,
 wherein the anti-misinsertion mechanism is adapted to allow full insertion of a first card having a first thickness into the card receiving slot by contact and movement of the first card with the first link and by movement of the second link by the first link, wherein the stopper is moved out of a path of insertion of the first card into the card receiving slot, and
 wherein the anti-misinsertion mechanism is adapted to prevent full insertion of a second card having a second relatively thinner thickness into the card receiving slot because of non-movement of the first link by the second card, wherein the stopper remains in a path of insertion of the second card into the card receiving slot to thereby prevent full insertion of the second card into the card receiving slot.

\* \* \* \* \*